(12) United States Patent
Liu et al.

(10) Patent No.: US 11,487,962 B2
(45) Date of Patent: Nov. 1, 2022

(54) DECISION-MAKING METHOD OF COMPREHENSIVE ALUMINA PRODUCTION INDEXES BASED ON MULTI-SCALE DEEP CONVOLUTIONAL NETWORK

(71) Applicant: Northeastern University, Shenyang (CN)

(72) Inventors: Changxin Liu, Shenyang (CN); Depeng Xu, Shenyang (CN); Jinliang Ding, Shenyang (CN); Tianyou Chai, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 380 days.

(21) Appl. No.: 16/955,490

(22) PCT Filed: Jul. 17, 2019

(86) PCT No.: PCT/CN2019/096331
§ 371 (c)(1),
(2) Date: Jun. 18, 2020

(87) PCT Pub. No.: WO2021/007801
PCT Pub. Date: Jan. 21, 2021

(65) Prior Publication Data
US 2021/0192272 A1    Jun. 24, 2021

(30) Foreign Application Priority Data
Jul. 16, 2019   (CN) ......................... 201910640653.9

(51) Int. Cl.
*G06K 9/62*    (2022.01)
*G06K 9/66*    (2006.01)
(Continued)

(52) U.S. Cl.
CPC .............. *G06K 9/6218* (2013.01); *C01F 7/02* (2013.01); *C22B 21/0015* (2013.01);
(Continued)

(58) Field of Classification Search
CPC .. G06K 9/6218; G06K 9/6269; G06V 30/194; C01F 7/02; C22B 21/0015;
(Continued)

(56) References Cited

FOREIGN PATENT DOCUMENTS

| CN | 105467946 A | 4/2016 |
|----|-------------|--------|
| CN | 105483310 A | 4/2016 |

(Continued)

OTHER PUBLICATIONS

Qiu et al, "Hybrid Model Based Optimal Control for a Metallurgy Process", 2008, Proceedings of the 17th World Congress The International Federation of Automatic Control, pp. 10844-10850 (7 pages) (Year: 2008).*

*Primary Examiner* — David F Dunphy
(74) *Attorney, Agent, or Firm* — Muncy, Geissler, Olds & Lowe, P.C.

(57) ABSTRACT

The invention provides a decision-making method of comprehensive alumina production indexes based on a multi-scale deep convolutional network. The method mainly consists of several sub-models: a multi-scale deep splicing convolutional neural network prediction sub-model reflecting the influence of bottom-layer production process indexes on the comprehensive alumina production indexes, a full connecting neural network prediction sub-model reflecting the influence of upper-layer dispatching indexes on the comprehensive alumina production indexes, a full connecting neural network prediction sub-model reflecting the influence of the comprehensive alumina production indexes at a past time on current comprehensive alumina production indexes, and a multi-scale information neural network inte- (Continued)

grated model for collaborative optimization of sub-model parameters. According to the method, through an integrated prediction model structure, a memory capacity of a superficial-layer network and a feature extraction capacity of a deep-layer network, a precise decision-making for the comprehensive alumina production indexes is realized.

7 Claims, 2 Drawing Sheets

(51) Int. Cl.
| | |
|---|---|
| *G06N 3/04* | (2006.01) |
| *G06N 3/08* | (2006.01) |
| *G06Q 10/06* | (2012.01) |
| *G06Q 50/04* | (2012.01) |
| *G06Q 10/04* | (2012.01) |
| *C01F 7/02* | (2022.01) |
| *C22B 21/00* | (2006.01) |
| *G06V 30/194* | (2022.01) |
| *G06F 17/16* | (2006.01) |

(52) U.S. Cl.
CPC ......... *G06K 9/6269* (2013.01); *G06N 3/0454* (2013.01); *G06N 3/0481* (2013.01); *G06N 3/084* (2013.01); *G06Q 10/04* (2013.01); *G06Q 10/0631* (2013.01); *G06Q 10/06395* (2013.01); *G06Q 50/04* (2013.01); *G06V 30/194* (2022.01); *G06F 17/16* (2013.01)

(58) Field of Classification Search
CPC .... G06N 3/0454; G06N 3/0481; G06N 3/084; G06Q 10/04; G06Q 10/0631; G06Q 10/06395; G06Q 50/04; G06F 17/16
See application file for complete search history.

(56) References Cited

FOREIGN PATENT DOCUMENTS

| | | | |
|---|---|---|---|
| CN | 105467946 A | * | 4/2018 |
| CN | 108873737 A | | 11/2018 |
| CN | 109376939 A | | 2/2019 |

* cited by examiner

DECISION-MAKING METHOD OF COMPREHENSIVE ALUMINA PRODUCTION INDEXES BASED ON MULTI-SCALE DEEP CONVOLUTIONAL NETWORK

BACKGROUND OF THE INVENTION

1. Field of the Invention

The invention relates to the technical field of decision-making for comprehensive alumina production, in particular to a decision-making method of comprehensive alumina production indexes based on a multi-scale deep convolutional network.

2. The Prior Arts

Aluminium and alloys thereof have many excellent properties, and besides, aluminium resources are rich, so that the aluminium industry has developed rapidly after coming on the scene. Large-scale equipment is beneficial for automatic detection and control of a technological process, and a production control and management system based on a microcomputer and a computer provides great potential for alumina plants to improve labor productivity, reduce raw material consumption and save energy.

Although relevant enterprises have performed project improvement and upgradation in the respect of an alumina smelting technology, problems of being poor in quality of raw materials, high in energy consumption of the project and low in product quality also exist. Most of the products are alumina in intermediate state, which can influence the overall technology application management and restrict the product structure.

In a traditional alumina production process, many control indexes are mainly set manually by knowledge workers such as managers, dispatchers and engineers by experience, and the production system cannot operate under optimized conditions.

Besides, for massive data produced during production of alumina, it is difficult to effectively mine the information existing in massive data by using a traditional machine learning algorithm.

SUMMARY OF THE INVENTION

The invention aims to solve the technical problem of providing a decision-making method of comprehensive alumina production indexes based on a multi-scale deep convolutional network to realize management decision-making for comprehensive alumina production in accordance with the deficiencies existing in the prior art.

In order to solve the technical problem, the decision-making method of comprehensive alumina production indexes based on a multi-scale deep convolutional network, is characterized by comprising the following steps:

Step 1: collecting production index data generated in an alumina production process, partitioning the collected production index data into a training dataset, a validation dataset and a test dataset by using a sample partition algorithm, and pre-processing the data by using a data pre-processing algorithm so as to obtain data which can be used for modelling;

Step 2: constructing a multi-scale deep splicing convolutional network prediction sub-model which reflects influence of bottom-layer production process indexes on comprehensive alumina production indexes:

Forming an information matrix by sampling value of alumina production process indexes closely related to the final comprehensive alumina production indexes for a period of time, which is expressed as follows:

$$Y_d = [v(k_v), v(k_v-1), v(k_v-2), \ldots, v(k_v-n_k)],$$

Wherein $Y_d$ is the input of the multi-scale deep splicing convolutional network prediction sub-model reflecting influence of the bottom-layer production process indexes, and contains the characteristic information of influence of the bottom-layer production process indexes on the final comprehensive alumina production indexes, and the size is $l_p \times n_k$; $l_p$ is the number of the bottom-layer production process indexes, $n_k$ is the sampling frequency of the bottom-layer production process indexes in a period of time, $v(k_v)$ is any one of the bottom-layer production process indexes, and k represents a certain sampling time;

The alumina bottom-layer production process indexes include: grinding AO and A/S, ore adjustment Nk, ore adjustment solid content, lime effective calcium, bauxite slurry solid content, bauxite slurry fineness, digestion red mud A/S, digestion red mud N/S, discharge A/S, digestion ak, digestion solid content, green liquor Nk, green liquor ak, green liquor seston, pregnant liquor seston, circulating spent liquor Nc/Nt and NK, circulation efficiency, seed precipitation spent liquor seston, seed precipitation end tank ak, decomposition rate, flat plate filter cake with water and alkali, flat spent seston, decomposition spent liquor ak and water content of red mud filter cakes;

The multi-scale deep splicing convolutional network prediction sub-model reflecting the influence of bottom-layer production process indexes on comprehensive alumina production indexes comprises 3 multi-scale convolutional layers, 3 pooling layers, 1 common convolutional layer, 1 full connected layer and an output transformation layer;

The multi-scale convolutional layer uses convolutional kernels of 3 sizes at the same time to perform convolution operations in parallel, and splices the obtained multi-scale features together as the input of the next layer; in a convolutional process, the size of the convolutional kernels is $k' \times k'$, $k'=1,3,5$, the moving stride is 1, and a filling and complementing manner during convolution is $k'/2$ complementing to ensure that the sizes of output features obtained under the size of each convolutional kernel are consistent;

The output of the multi-scale convolutional layer comprises two parts: one part of the output is obtained by splicing multi-scale features obtained under different sizes of the convolutional kernels and is used as the input of the next layer; the other part of the output is obtained by optimizing a selection method, firstly, the corresponding output under each scale feature is calculated, and then the corresponding scale feature which maximizes the output is selected as the optimal scale feature of the layer to be used as the output and is directly connected to a final full connected layer;

The size of the convolutional kernel in the common convolutional layer is 1×1; the downsampling manner in each pooling layer is Max pooling, and the moving stride and downsampling ratio are both $s_r=2$; all the convolutional layers use a ReLU activation function;

And the full connected layer is obtained by a cross-layer splicing manner of the optimal scale features of all the convolutional layers, and contains the optimal scale features at various abstract levels;

Step 3: constructing a full connected neural network prediction sub-model which reflects the influence of alumina upper-layer dispatching indexes on the comprehensive alumina production indexes:

Forming an information matrix by the sampling value of the upper-layer dispatching index in a period of time, which is expressed as follows:

$$X_d=[q(k_q),v(k_q-1),v(k_q-2),\ldots,v(k_q-n_h)],$$

Wherein $X_d$ is the input of the prediction sub-model reflecting the influence of the upper-layer dispatching indexes on the comprehensive alumina production indexes, the size is $l_h \times n_h$, $l_h$ is the number of the upper-layer dispatching indexes, $n_h$ is the sampling frequency of the upper-layer dispatching indexes in a period of time, $q(k_q)$ is any one of the upper-layer dispatching indexes, and $k_q$ represents a certain sampling time;

The alumina upper-layer dispatching indexes include: feed quantity, total alkali liquor storage amount, a diaphragm pump, a roller mill, a ball mill, a leaf filter, a reclaimer, a vertical plate, an external discharge pump, an evaporator, roaster operation time, alkali liquor addition amount, whole-day ash discharging amount, total digestion feed quantity, ore breaking quantity and whole-day ore discharging quantity; and The full connected neural network prediction sub-model uses a single-layer full connected neural network, the number of nodes in the full connected network is consistent with the number of the upper-layer dispatching indexes, and a Sigmoid activation function is selected as an activation function;

Step 4: constructing a full connected neural network prediction sub-model which reflects the influence of comprehensive alumina production indexes on the current comprehensive alumina production indexes at the past time:

Step 4.1: defining a sample set of historical working conditions: simply expressing working conditions $\{X_d,Y_d\}$ through initial production conditions and $X_d$ of the upper-layer dispatching indexes, and besides, forming the sample set $T'=\{(X_d, Z_{d+1})\} \subset T$ of historical working conditions from the corresponding comprehensive alumina production indexes, wherein $d=1,2,\ldots,n_d$;

The comprehensive alumina production indexes comprise commercial alumina yield, actual alumina yield, aluminium hydroxide yield, alumina soda consumption, alumina energy consumption and alumina grade rate.

Step 4.2: grouping the historical working conditions:

Firstly, adopting an automatic clustering method based on a Gaussian mixed model so as to obtain classification of the historical working conditions; expressing the clustering result as $C=\{c_1,\ldots,c_{l_c}\}$, wherein $l_c$ is the number of the obtained historical working conditions;

Step 4.3: searching for the comprehensive alumina production indexes at the past time related to the current conditions so as to obtain comprehensive alumina production index information not only including the correlation information of the comprehensive alumina production indexes at the past time, but also including the correlation information of the historical working conditions and the current working conditions of the comprehensive alumina production indexes, Wherein performing correlation measurement on the comprehensive alumina production indexes at the past time, which are to be selected and related to the current working condition, through a Gaussian kernel function, as shown in the following formula, $$K(d(\cdot)) = \frac{1}{\sqrt{2\pi}}e^{-\frac{1}{2}d(\cdot)^2},$$

Wherein $K(d(\cdot))$ is a kernel function and $d(\cdot)$ represents Euclidean distance;

Giving the working condition $X_d$ at a time d, firstly, calculating the probability that the working condition is distributed to the classification of various existing historical working conditions, and recording the result as $P=\{p_i(X_d|c_i)\}$, $i=1,2,\ldots,l_c$; then, in the classification of working conditions with the maximum probability, selecting first $l_k$ working conditions under the classification of the working conditions through a k-nearest neighbor algorithm, which is denoted as:

$$\hat{X}_{top-nb}=\{X_{d_{top-1}}{}^{cj},c_i \in C|i \neq j\},$$

Wherein $c_j$ expresses the classification of the jth historical working condition, satisfying $p_j=\max(P)$;

Recording the center point of the classification of the remaining working conditions as:

$$\hat{X}_{center-nb}=\{X_{d_{center}}{}^{cj},c_i \in C|i \neq j\},$$

Using $\delta_d$ to express a vector consisting of the correlation between the working condition $X_d$ at the time d and the working conditions in the relevant historical working conditions $\hat{X}_d=[\hat{X}_{top-nb}, \hat{X}_{center-nb}]$; combining the comprehensive alumina production index information $z_d$, $\delta_d$ corresponding to the historical working condition $X_d$ related to the working condition at the time d, and the classification probability $p_d$ corresponding to the historical working conditions together, and recording the combining result as:

$$Z_d=[z_d,\delta_d,p_d]$$

Wherein $Z_d$ is used as the input of the full connected neural network prediction sub-model reflecting the influence of the comprehensive alumina production indexes at the past time on the current comprehensive alumina production indexes, and the size is $(l_c+l_k-1) \times 3$; $Z_d$ not only contains the comprehensive alumina production indexes at the past time, but also the correlation information between the historical working condition and the current working condition of the comprehensive alumina production indexes; and The sub-model adopts a single-layer full connected neural network, the number of nodes of the full connected network is consistent with the size of input variables, and the Sigmoid activation function is selected as the activation function;

Step 5: building a multi-scale information neural network integrated model for collaborative optimization of sub-model parameters, Wherein the integrated model consists of a single-layer neural network, the number of input source variables is 3, corresponding to outputs of the three prediction sub-models established in the steps 2 to 4, and the number of output variables is 1, which indicates the prediction value of comprehensive alumina production indexes; the Sigmoid activation function is selected as the nonlinear activation function of the output nodes; the integrated model trains network parameters of the three prediction sub-models at the same time according to the gradient information of the prediction error loss function of the comprehensive alumina production indexes, i.e., the training errors of the model can be reversely propagated to the input layer of the prediction sub-model reflecting the influence of various types of information on the comprehensive alumina production indexes at the same time, and the weight of each type of input information is subjected to common influence of other input information on the training errors of the model at the same time, so that the collaborative optimization of the influence weight of different time scale information on the comprehensive alumina production indexes is realized, and besides, the complexity of the prediction sub-models is reduced;

In the common training process of a multi-scale information neural network integrated model for collaborative optimization of sub-model parameters, an AdaGrad algorithm is selected for parameter updating of the multi-scale deep splicing convolutional neural network prediction sub-model, and a random gradient descent method is selected for parameter updating of the other two single-layer full connected neural network sub-models.

Step 6: performing optimization decision-making on the comprehensive alumina production indexes through the established models:

According to one or more models established for comprehensive alumina production indexes, performing single-objective or multi-objective optimization decision-making; and giving the boundary conditions of decision-making variables, and performing optimization decision-making through a single-objective or multi-objective optimization algorithm, so as to obtain the optimization decision-making result of the comprehensive alumina production indexes.

The beneficial effects generated by adopting the above technical solution lie in that: through the adoption of the decision-making method of comprehensive alumina production indexes based on a multi-scale deep convolutional network provided by the invention, effective information in the data generated in the alumina production process can be fully explored, collaborative optimization of the influence weight of different time scale information on alumina production indexes is realized, and the precision of the established prediction model is greatly improved. Effective dispatching of various resources in the alumina production process can be realized, resource waste is reduced, and the production quality and the benefit of alumina production are improved.

DETAILED DESCRIPTION OF THE PREFERRED EMBODIMENT

The detailed description of the invention is further elaborated in combination with the drawings and the embodiment. The following embodiment is used to illustrate the invention, but is not intended to limit the scope of the invention.

Figure 1:
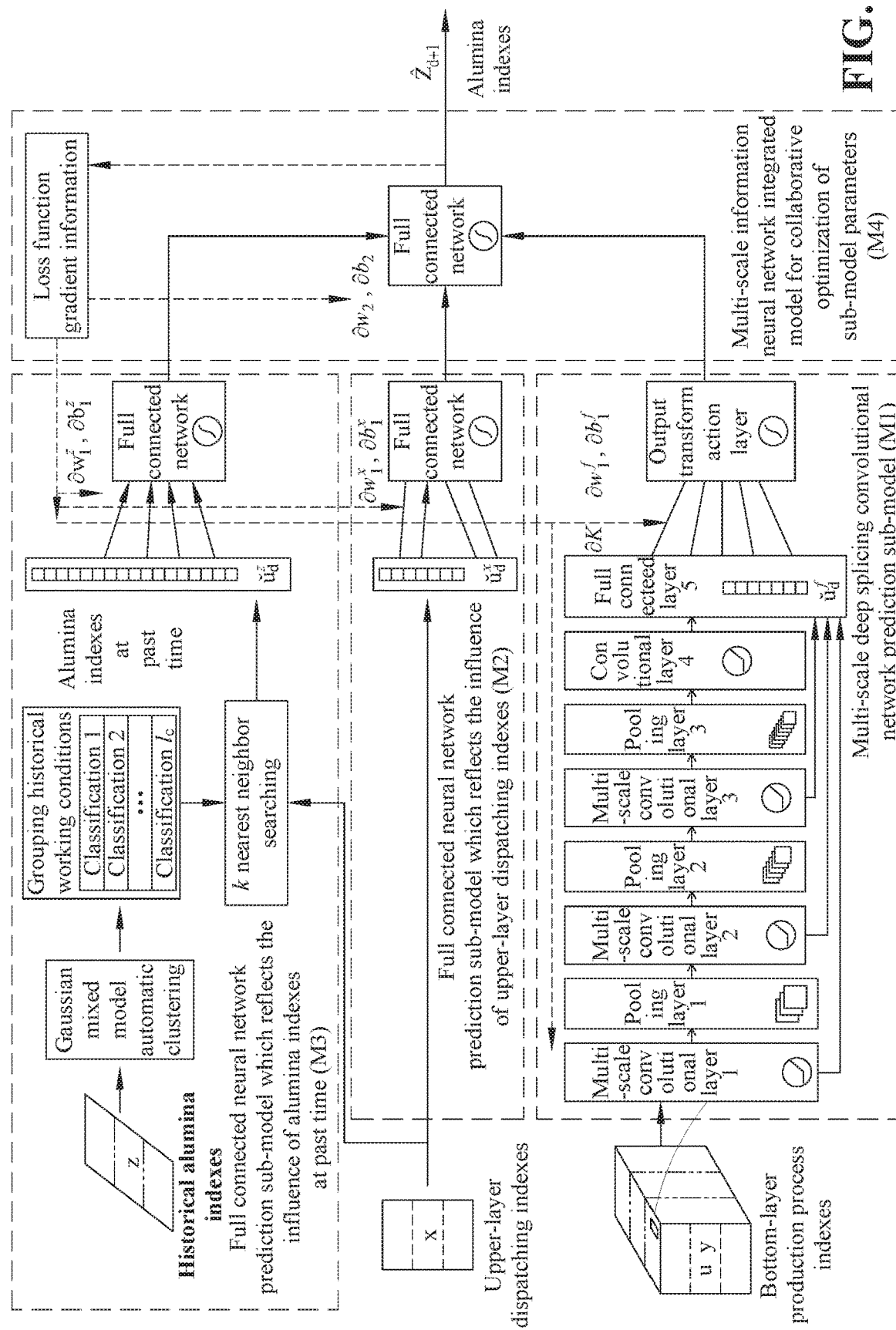
FIG. 1 is a flowchart of a decision-making method of comprehensive alumina production indexes based on a multi-scale deep convolutional neural network according to the embodiment of the invention.

In this embodiment, a decision-making method of comprehensive alumina production indexes based on a deep convolutional network, as shown in FIG. 1, comprises the following steps:

Step 1: collecting production index data generated in an alumina production process, partitioning the collected production index data into a training dataset, a validation dataset and a test dataset by using a sample partition algorithm, and pre-processing the data by using a data pre-processing algorithm so as to obtain data which can be used for modelling.

In the embodiment, the bottom-layer production process index data in the alumina production process within one month is collected as shown in Table 1.

TABLE 1

| Time sequence number | BOTTOM-LAYER PRODUCTION PROCESS INDEX DATA sample |
|---|---|
| 1 | 3.984314, 4.4, 322, 357, 0.327, 2.542941, 803, . . . , 7481.451529, 1681.090452, 21.7, 19.9, 2762.857691, 0.875 |
| 2 | 4.317111, 10.2, 333, 253, 0.015, 2.522122, 954, . . . , 889 1.41272, 2181.135371, 20.8, 18.32, 2302.865145, 0.784 |
| 3 | 4.884135, 10.7, 323, 317, 0.242, 2.522122, 954, . . . , 8891.379545, 2301.061061, 21.2, 19.98, 2372.888571, 0.762 |
| 4 | 4.459016, 10.7, 386, 287, 0.411, 2.522122, 954, . . . , 8891.398573, 2441.115933, 18, 16.13, 2492.9, 1.21 |
| 5 | 4.728682, 4.5, 414, 334, 0.011, 2.53603, 909, . . . , 9661.381733, 1841.144191, 19.6, 17.13, 2402.882614, 1.267 |
| 6 | 4.829991, 9.5, 319, 329, 0.115, 2.53603, 909, . . . , 9661.39877, 2141.104083, 19.2, 17.39, 3362.920118, 0.893 |
| 7 | 4.471074, 9.8, 348, 280, 0.034, 2.53603, 909, . . . , 9661.392813, 2341.091925, 21.5, 19.69, 2092.867864, 1.321 |
| 8 | 5.097132, 8.1, 336, 309, 0.274, 2.762571, 937, . . . , 8941.385423, 240 1.06701, 20.7, 19.4, 2393.220661, 0.911 |
| 9 | 4.800725, 10.8, 310, 286, 1.139, 2.444321, 834, . . . , 9011.401044 1981.127901, 20.9, 18.53, 2282.947068, 1.189 |
| 10 | 4.707379, 9.8, 387, 326, 0.115, 2.444321, 834, . . . , 9011.406646 2371.082251, 20, 18.48, 2592.941878, 1.122 |
| . . . | 6.325167, 6.8, 352, 268, 0.206, 2.50048, 711, . . . , 7601.359253 1991.112782, 22.2, 19.95, 2352.901837, 1.273 |
| 992 | 5.404624, 6.4, 344, 341, 0.123, 2.621695, 768, . . . , 6861.372769 1811.132686, 21, 18.54, 2322.828949, 1.768 |
| 993 | 5.71134, 6.7, 365, 249, 0.105, 2.621695, 768, . . . , 6861.420589 1741.085884, 22, 20.26, 245 2.95857, 0.877 |
| 994 | 4.546926, 12.1, 325, 219, 0.105, 2.566212, 869, . . . , 8721.411038 1921.131222, 22.5, 19.89, 2142.839053, 0.792 |
| 995 | 5.190909, 9.2, 340, 290, 0.212, 2.529651, 833, . . . , 6981.400877, 204 1.08867, 22.1, 20.3, 2262.776577, 0.876 |
| 996 | 5.048716, 5.8, 318, 307, 0.192, 2.457165, 649, . . . , 5091.381772 1991.038839, 22.2, 21.37, 4142.948894, 0.614 |
| 997 | 4.877498, 6.5, 365, 311, 0.074, 2.613749, 778, . . . , 6951.364773 2231.082423, 21.8, 20.14, 2603.004254, 0.386 |
| 998 | 5.045372, 3.9, 392, 266, 0.189, 2.613749, 778, . . . , 6951.357524 2641.104199, 21.3, 19.29, 2782.925957, 1.077 |
| 999 | 6.107724, 7.4, 330, 320, 0.156, 2.745085, 750, . . . , 5871.354931, 243 1.22393, 22.3, 18.22, 4082.972786, 0.22 |
| 1000 | 4.629475, 7.6, 348, 336, 0.143, 2.745085, 750, . . . , 5871.352686 2411.172775, 22.4, 19.1, 319 3.00776, 0.218 |

In the embodiment, the upper-layer dispatching index data generated during the alumina production process within one month is collected, as shown in Table 2:

TABLE 2

UPPER-LAYER DISPATCHING INDEX DATA TABLE

| Time sequence number | sample |
|---|---|
| 1 | 1047, 1350, 122, 350, 300, . . . , 53808, 2242, 1950, 5400, 2400 |
| 2 | 1180, 1404, 130, 624, 1000, . . . , 52014, 2167.3, 400, 2000, 2100 |
| 3 | 804, 1100, 54, 940, 1220, . . . , 23343, 972.7, 2040, 4000, 2800 |
| 4 | 1197, 2400, 23, 800, 1200, . . . , 53140, 2214, 2200, 1600, 1600 |
| 5 | 1542, 1500, 32, 700, 1000, . . . , 54278, 2262, 600, 5500, 1200 |
| 6 | 1103, 870, 51, 940, 1370, . . . , 54385, 2266, 1480, 6900, 1160 |
| 7 | 1168, 936, 55, 390, 1000, . . . , 54480, 2270, 1170, 6000, 2000 |
| 8 | 1175, 624, 40, 546, 1200, . . . , 54480, 2270, 2340, 4000, 1600 |
| 9 | 1368, 650, 108, 975, 1500, . . . , 53880, 2245, 525, 2800, 1200 |
| 10 | 1181, 500, 35, 550, 1070, . . . , 54480, 2270, 1720, 6800, 1000 |
| ... | ... |
| 292 | 1234, 350, 34, 800, 1000, . . . , 54480, 2270, 1600, 5800, 1000 |
| 293 | 1022, 350, 64, 600, 900, . . . , 54480, 2270, 1200, 5200, 900 |
| 294 | 957, 350, 60, 800, 1200, . . . , 53544, 2231, 2400, 5500, 1500 |
| 295 | 933, 1800, 64, 900, 1950, . . . , 46248, 1926, 2100, 4800, 1600 |
| 296 | 949, 600, 43, 825, 1200, . . . , 53862, 2244, 2100, 6000, 1400 |
| 297 | 1051, 585, 48, 780, 1000, . . . , 54480, 2270, 1482, 4800, 1520 |
| 298 | 1033, 429, 52, 546, 1800, . . . , 54480, 2270, 1092, 5600, 1080 |
| 299 | 911, 340, 112, 940, 680, . . . , 54480, 2270, 1100, 3200, 1320 |
| 300 | 1332, 1200, 44, 600, 1200, . . . , 51360, 2140, 1500, 2400, 3400 |

In the embodiment, the actual alumina yield data generated in the alumina production process within one month is collected, as shown in Table 3:

TABLE 3

ACTUAL ALUMINA YIELD DATA

| | Time sequence number | | | | | | | | | |
|---|---|---|---|---|---|---|---|---|---|---|
| | 1 | 2 | 3 | 4 | 5 | 6 | 7 | 8 | 9 | 10 |
| alumina yield | 6849 | 6621 | 6393 | 6315 | 6191 | 6035 | 6039 | 6154 | 6086 | 6153 |

| | Time sequence number | | | | | | | | |
|---|---|---|---|---|---|---|---|---|---|
| | ... | 292 | 293 | 294 | 295 | 296 | 297 | 298 | 299 | 300 |
| Alumina yield | ... | 6055 | 5873 | 6231 | 6063 | 6160 | 6091 | 6092 | 6238 | 6396 |

Figure 2:
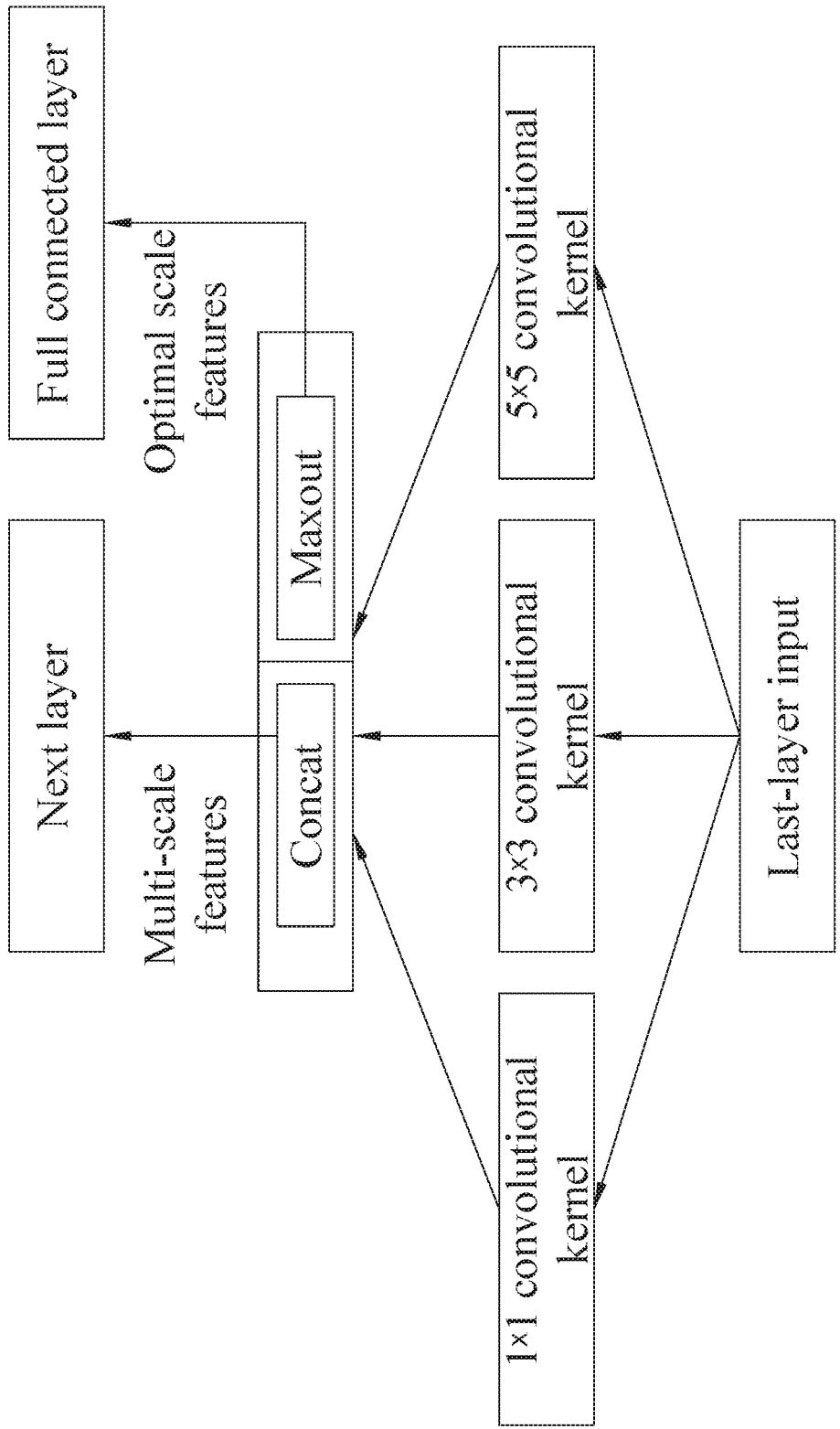
FIG. 2 is a schematic diagram of a multi-scale convolutional layer according to the embodiment of the invention.

Step 2: constructing a multi-scale deep splicing convolutional network prediction sub-model which reflects influence of bottom-layer production process indexes on comprehensive alumina production indexes;

Forming an information matrix by sampling value of alumina production process indexes closely related to the final comprehensive alumina production indexes for a period of time, which is expressed as follows:

$$Y_d = [v(k_v), v(k_v-1), v(k_v-2), \ldots, v(k_v-n_k)],$$

Wherein $Y_d$ is the input of the multi-scale deep splicing convolutional network prediction sub-model reflecting the influence of the bottom-layer production process indexes, and contains the characteristic information of the influence of the bottom-layer production process indexes on the final comprehensive alumina production indexes, and the size is $l_p \times n_k$; $l_p$ is the number of the bottom-layer production process indexes, $n_k$ is the sampling frequency of the bottom-layer production process indexes in a period of time, $v(k_v)$ is any one of the bottom-layer production process indexes, and $k_v$ represents a certain sampling time;

The alumina bottom-layer production process indexes include: grinding AO and A/S, ore adjustment Nk, ore adjustment solid content, lime effective calcium, bauxite slurry solid content, bauxite slurry fineness, digestion red mud A/S, digestion red mud N/S, discharge A/S, digestion ak, digestion solid content, green liquor Nk, green liquor ak, green liquor seston, pregnant liquor seston, circulating spent liquor Nc/Nt and NK, circulation efficiency, seed precipitation spent liquor seston, seed precipitation end tank ak, decomposition rate, flat plate filter cake with water and alkali, flat spent seston, decomposition spent liquor ak and water content of red mud filter cakes;

In a period of time, in a process information matrix obtained by sampling, all production process indexes are arranged in sequence according to the front and back processes, and besides, the sampling time is arranged according to the direction of production; the spatial position relation of the process information matrix reflects the spatial distribution of the production process indexes, and at the same time, contains characteristic information including time delay and the like which influences the comprehensive alumina production indexes;

The multi-scale deep splicing convolutional network prediction sub-model reflecting the influence of bottom-layer production process indexes on comprehensive alumina production indexes comprises 3 multi-scale convolutional layers, 3 pooling layers, 1 common convolutional layer, 1 full connected layer and an output transformation layer, wherein the structure of 3 multi-scale convolutional layers is shown in FIG. 2;

The multi-scale convolutional layer uses convolutional kernels of 3 sizes at the same time to perform convolution operations in parallel, and splices the obtained multi-scale features together as the input of the next layer; in a convolutional process, the size of the convolutional kernels is $k' \times k', k'=1,3,5$, the moving stride is 1, and a filling and complementing manner during convolution is $k'/2$ complementing to ensure that the sizes of output features obtained under the size of each convolutional kernel are consistent;

The output of the multi-scale convolutional layer comprises two parts: one part of the output is obtained by splicing multi-scale features obtained under different sizes of the convolutional kernels and is used as the input of the next layer; the other part of the output is obtained by optimizing a selection method, firstly, the corresponding output under each scale feature is calculated, and then the corresponding scale feature which maximizes the output is selected as the optimal scale feature of the layer to be used as the output and is directly connected to a final full connected layer;

The size of the convolutional kernel in the common convolutional layer is 1×1; the downsampling manner in each pooling layer is Max pooling, and the moving stride and downsampling ratio are both $s_r=2$; all the convolutional layers use a ReLU activation function;

The full connected layer is obtained by a cross-layer splicing manner of the optimal scale features of all the convolutional layers, and contains the optimal scale features at various abstract levels, and improving the precision of the prediction sub-model which reflects the influence of the production process indexes on the comprehensive alumina production indexes is facilitated;

In the embodiment, the sample data of the bottom-layer production process indexes is subjected to sample dividing by a setting-aside method, besides, the data is subjected to normalizing treatment, and the multi-scale deep splicing convolutional network prediction sub-model is trained through processed data, wherein the sizes of the convolutional kernels are 1×1, 3×3 and 5×5 respectively; the pooling downsampling ratio and amplitude are both set to 2; the number of features of the four convolutional layers are 16, 32, 64, 32 respectively; and in order to solve the problem of gradient disappearance, ReLU is selected as a nonlinear activation function in the multi-scale deep splicing convolutional network;

Step 3: constructing a full connected neural network prediction sub-model which reflects the influence of alumina upper-layer dispatching indexes on the comprehensive alumina production indexes:

Forming an information matrix by the sampling value of the upper-layer dispatching index in a period of time, which is expressed as follows:

$$X_d=[q(k_q),v(k_q-1),v(k_q-2),v(k_q-n_h)],$$

Wherein $X_d$ is the input of the prediction sub-model reflecting the influence of the upper-layer dispatching index on the comprehensive alumina production indexes, the size is $1_h \times n_h$, $1_h$ is the number of the upper-layer dispatching index, $n_h$ is the sampling frequency of the upper-layer dispatching indexes in a period of time, $q(k_q)$ is any one of the upper-layer dispatching indexes, $k_q$ represents a certain sampling time;

The alumina upper-layer dispatching indexes comprise feed quantity, total alkali liquor storage amount, a diaphragm pump, a roller mill, a ball mill, a leaf filter, a reclaimer, a vertical plate, an external discharge pump, an evaporator, roaster operation time, alkali liquor addition amount, whole-day ash discharging amount, total digestion feed quantity, ore breaking quantity and whole-day ore discharging quantity.

The full connected neural network prediction sub-model uses a single-layer full connected neural network, the number of nodes in the full connected network is consistent with the number of the upper-layer dispatching indexes, and a Sigmoid activation function is selected as an activation function;

In the embodiment, the collected sample data of the alumina upper-layer dispatching indexes is subjected to sample dividing by a setting-aside method, besides, the data is subjected to normalizing treatment, and the processed data is inputted to the full connected neural network, wherein the Sigmoid activation function is selected as the activation function to accelerate the training speed;

Step 4: constructing a full connected neural network prediction sub-model which reflects the influence of comprehensive alumina production indexes on the current comprehensive alumina production indexes at the past time:

Step 4.1: defining a sample set of historical working conditions: taking into account the complexity of actual calculation, simply expressing working conditions $\{X_d, Y_d\}$ through initial production conditions including main information and $X_d$ of the upper-layer dispatching indexes, and besides, forming a historical working condition sample set $T'=\{(X_d, Z_{d+1})\} \subset T$ from the corresponding comprehensive alumina production indexes, wherein $d=1,2,\ldots,n_d$;

The comprehensive alumina production indexes comprise commercial alumina yield, actual alumina yield, aluminium hydroxide yield, alumina soda consumption, alumina energy consumption and alumina grade rate.

Step 4.2: grouping the historical working conditions:

Wherein firstly, an automatic clustering method based on a Gaussian mixture model is used to obtain the classification of historical working conditions; compared with other methods (such as k-means), the method has the advantages that the probability that a certain working condition belongs to different working condition classifications can be output at the same time; the output probability obviously contains more information than a single judgment which only gives whether it belongs to a certain working condition classification; a Gaussian mixture model, like K-means and other methods, cannot guarantee that a global optimal solution can always be obtained, and the complexity of each iterative calculation is high; therefore, in the specific implementation process, firstly the center point of rough working condition classifications is obtained by an AFK-MC2 algorithm, and then the center point as an initial value is introduced into a Gaussian mixture model clustering method for fine iteration, so that a good balance in clustering quality and calculation speed is achieved; the above clustering results are expressed as $C=\{c_1,\ldots,c_{t_c}\}$, wherein $1_c$ is the number of the obtained historical working condition classifications;

In the embodiment, the classification of historical working conditions is obtained by an automatic clustering method based on the Gaussian mixture model, firstly, the center point of rough working condition classifications is obtained by the AFK-MC2 algorithm, and then, the center point as the initial value is introduced into the Gaussian mixture model clustering method for fine iteration, so that a good balance in clustering quality and calculation speed is achieved, wherein the number of automatic clusters is 5;

Step 4.3: searching for the comprehensive alumina production indexes at the past time related to the current conditions so as to obtain comprehensive alumina production index information not only including the correlation information of the comprehensive alumina production indexes at the past time, but also including the correlation information of the historical working conditions and the current working conditions of the comprehensive alumina production indexes, Wherein performing correlation measurement on the comprehensive alumina production indexes at the past time, which are to be selected and related to the current working condition, through a Gaussian kernel function, as shown in the following formula:

$$K(d(\cdot)) = \frac{1}{\sqrt{2\pi}} e^{-\frac{1}{2}d(\cdot)^2},$$

Wherein $K(d(\cdot))$ is a kernel function and $d(\cdot)$ represents Euclidean distance;

Giving the working condition $X_d$ at a time d, firstly, calculating the probability that the working condition is distributed to the classification of various existing historical working conditions, and recording the result as $P=\{p_i(X_d|c_i)\}$, $i=1,2,\ldots,1_c$; then, in the classification of working conditions with the maximum probability, selecting first $1_k$ working conditions under the classification of the working conditions through a k-nearest neighbor algorithm, which is denoted as:

$$\hat{X}_{top-nb} = \{X_{d_{top-1}} X^{cj}, c_i \in C | i \neq j\},$$

Wherein $c_j$ expresses the classification of the jth historical working condition, satisfying $p_j=\max(P)$; in the embodiment, $1_k=5$;

Recording the center point of the classification of the remaining working conditions as:

$$\hat{X}_{center-nb} = \{X_{d_{center}}{}^{cj}, c_i \in C | i \neq j\},$$

Using $\delta_d$ to express a vector consisting of the correlation between the working condition $X_d$ at the time d and the working conditions in the relevant historical working conditions $\hat{X}_d = [\hat{X}_{top-nb}, \hat{X}_{center-nb}]$; combining the comprehensive alumina production index information $z_d$, $\delta_d$ corresponding to the historical working condition $\hat{X}_d$ related to the working condition at the time d, and the classification probability $p_d$ corresponding to the historical working conditions together, and recording the combining result as:

$$Z_d = [z_d, \delta_d, p_d],$$

Wherein $Z_d$ is used as the input of the full connected neural network prediction sub-model reflecting the influence of the comprehensive alumina production indexes at the past time on the current comprehensive alumina production indexes, and the size is $(1_c+1_k-1)\times 3$; $Z_d$ not only contains the comprehensive alumina production indexes at the past time, but also the correlation information between the historical working condition and the current working condition of the comprehensive alumina production indexes;

The sub-model adopts a single-layer full connected neural network, the number of nodes of the network is consistent with the size of input variables, and the Sigmoid activation function is selected as the activation function to accelerate the training speed;

Step 5: building a multi-scale information neural network integrated model for collaborative optimization of sub-model parameters, Wherein the integrated model consists of a single-layer neural network, the number of input source variables is 3, corresponding to outputs of the three prediction sub-models established in the steps 2 to 4, and the number of output variables is 1, which indicates the prediction value of comprehensive alumina production indexes; the Sigmoid activation function is selected as the nonlinear activation function of the output nodes; the integrated model trains network parameters of the three prediction sub-models at the same time according to the gradient information of the prediction error loss function of the comprehensive alumina production indexes, i.e. the training errors of the model can be reversely propagated to the input layer of the prediction sub-model reflecting the influence of various types of information on the comprehensive alumina production indexes at the same time, and the weight of each type of input information is subjected to common influence of other input information on the training errors of the model at the same time, so that the collaborative optimization of the influence weight of different time scale information on the comprehensive alumina production indexes is realized, and besides, the complexity of the prediction sub-models is reduced;

In the common training process of a multi-scale information neural network integrated model for collaborative optimization of sub-model parameters, an AdaGrad algorithm is selected for parameter updating of the multi-scale deep splicing convolutional neural network prediction sub-model, and a random gradient descent method is selected for parameter updating of the other two single-layer full connected neural network sub-models.

Step 6: performing optimization decision-making on the comprehensive alumina production indexes through the established models:

According to one or more models established for comprehensive alumina production indexes, performing single-objective or multi-objective optimization decision-making; and giving the boundary conditions of decision-making variables, and performing optimization decision-making through a single-objective or multi-objective optimization algorithm, so as to obtain the optimization decision-making result of the comprehensive alumina production indexes.

Finally, it should be noted that the above embodiment is only used to illustrate without limiting the technical solution of the invention; although the invention has been described in detail with reference to the foregoing embodiment, it should be understood by those skilled in the art that these technical solutions described in the foregoing embodiment may be modified or some or all of its technical features equivalently may be substituted; and however, these modifications or substitutions do not cause the essence of the corresponding technical solution to depart from the scope defined by the claims of the invention.

What is claimed is:

1. A decision-making method of comprehensive alumina production indexes based on a multi-scale deep convolutional network, comprising the following steps:

step 1: collecting production index data generated in an alumina production process, partitioning the collected production index data into a training dataset, a validation dataset and a test dataset by using a sample partition algorithm, and pre-processing the data by using a data pre-processing algorithm so as to obtain data which can be used for modelling;

step 2: constructing a multi-scale deep splicing convolutional network prediction sub-model which reflects influence of bottom-layer production process indexes on the comprehensive alumina production indexes;

forming an information matrix by a sampling value of alumina production process indexes closely related to final comprehensive alumina production indexes for a period of time, which is expressed as follows:

$$Y_d = [v(k_v), v(k_v-1), v(k_v-2), \ldots v(k_v-n_k)],$$

wherein $Y_d$ is an input of the multi-scale deep splicing convolutional network prediction sub-model reflecting the influence of the bottom-layer production process indexes, and contains characteristic information of the influence of the bottom-layer production process indexes on the final comprehensive alumina production indexes, and a size thereof is $1_p \times n_k$, $1_p$, is a number of the bottom-layer production process indexes, $n_k$ is a sampling frequency of the bottom-layer production process indexes in a period of time, $v(k_v)$ is any one of the bottom-layer production process indexes, and $k_v$ represents a certain sampling time, wherein the multi-scale deep splicing convolutional network prediction sub-model reflecting the influence of the bottom-layer production process indexes on the comprehensive alumina production indexes comprises 3 multi-scale convolutional layers, 3 pooling layers, 1 common convolutional layer, 1 full connected layer and an output transformation layer;

step 3: constructing a full connected neural network prediction sub-model which reflects influence of alumina upper-layer dispatching indexes on the comprehensive alumina production indexes;

forming an information matrix by a sampling value of the upper-layer dispatching indexes in a period of time, which is expressed as follows:

$$X_d=[q(k_q),v(k_q-1),v(k_q-2),\ldots,v(k_q-n_h)],$$

wherein $X_d$ is an input of the prediction sub-model reflecting the influence of the upper-layer dispatching indexes on the comprehensive alumina production indexes, a size thereof is $l_h \times n_h$, $l_h$ is a number of the upper-layer dispatching indexes, $n_h$ is a sampling frequency of the upper-layer dispatching indexes in a period of time, $q(k_q)$ is any one of the upper-layer dispatching indexes, $k_q$ represents a certain sampling time, wherein the full connected neural network prediction sub-model uses a single-layer full connected neural network, a number of nodes of a full connected network is consistent with the number of the upper-layer dispatching indexes, and a Sigmoid activation function is selected as an activation function;

step 4: constructing the full connected neural network prediction sub-model which reflects influence of the comprehensive alumina production indexes at a past time on current comprehensive alumina production indexes:

step 4.1: defining a sample set of historical working conditions: simply expressing working conditions $\{X_d, Y_d\}$ through initial production conditions and $X_d$ of the upper-layer dispatching indexes, and besides, forming the sample set $T'=\{(X_d,Z_{d+1})\} \subset T$ of the historical working conditions from corresponding comprehensive alumina production indexes, wherein $d=1,2,\ldots,n_d$;

step 4.2: grouping the historical working conditions:

firstly, adopting an automatic clustering method based on a Gaussian mixed model so as to obtain classification of the historical working conditions; expressing a clustering result as $C=\{c_1,\ldots c_{l_c}\}$, wherein $l_c$ is a number of the obtained historical working conditions;

step 4.3: searching for the comprehensive alumina production indexes at the past time related to current working conditions so as to obtain comprehensive alumina production index information not only including correlation information of the comprehensive alumina production indexes at the past time, but also including correlation information of the historical working conditions and the current working conditions of the comprehensive alumina production indexes, wherein the sub-model adopts a single-layer full connected neural network, the number of nodes of the full connected network is consistent with a size of input variables, and the Sigmoid activation function is selected as an activation function;

step 5: building a multi-scale information neural network integrated model for collaborative optimization of sub-model parameters, the integrated model consists of a single-layer neural network, wherein a number of input source variables is 3, corresponding to outputs of the three prediction sub-models established in the steps 2 to 4, and a number of output variables is 1, which indicates a prediction value of the comprehensive alumina production indexes; the Sigmoid activation function is selected as a nonlinear activation function of output nodes; the integrated model trains network parameters of the three prediction sub-models at the same time according to gradient information of a prediction error loss function of the comprehensive alumina production indexes, i.e. training errors of the integrated model can be reversely propagated to an input layer of the prediction sub-model reflecting influence of various types of information on the comprehensive alumina production indexes at the same time, and a weight of each type of input information is subjected to common influence of other input information on the training errors of the integrated model at the same time, so that the collaborative optimization of influence weight of different time scale information on the comprehensive alumina production indexes is realized, and besides, complexity of the prediction sub-models is reduced; and step 6: performing optimization decision-making on the comprehensive alumina production indexes through the established models:

according to one or more models established for the comprehensive alumina production indexes, performing single-objective or multi-objective optimization decision-making; and giving boundary conditions of decision-making variables, and performing the optimization decision-making through a single-objective or multi-objective optimization algorithm, so as to obtain an optimization decision-making result of the comprehensive alumina production indexes.

2. The decision-making method according to claim 1, wherein the bottom-layer production process indexes in the step 2 comprise: grinding AO and A/S, ore adjustment Nk, ore adjustment solid content, lime effective calcium, bauxite slurry solid content, bauxite slurry fineness, digestion red mud A/S, digestion red mud N/S, discharge A/S, digestion ak, digestion solid content, green liquor Nk, green liquor ak, green liquor seston, pregnant liquor seston, circulating spent liquor Nc/Nt and Nk, circulation efficiency, seed precipitation spent liquor seston, seed precipitation end tank ak, decomposition rate, flat plate filter cakes with water and alkali, flat spent seston, decomposition spent liquor ak and water content of red mud filter cakes.

3. The decision-making method according to claim 1, wherein the multi-scale convolutional layer in the step 2 uses convolutional kernels of 3 sizes at the same time to perform convolution operations in parallel, and splices multi-scale features obtained together as an input of next layer; in a convolutional process, a size of the convolutional kernels is $k' \times k', k'=1,3,5$, a moving stride is 1, and a filling and complementing manner during convolution is $k'/2$ complementing to ensure that sizes of the output features obtained under the size of each convolutional kernel are consistent;

an output of the multi-scale convolutional layer comprises two parts: one part of the output is obtained by splicing the multi-scale features obtained under different sizes of the convolutional kernels and is used as the input of the next layer; the other part of the output is obtained by optimizing a selection method, firstly, a corresponding output under each scale feature is calculated, and then a corresponding scale feature which maximizes the output is selected as an optimal scale feature of the layer to be used as the output and is directly connected to a final full connected layer;

the size of the convolutional kernel in the common convolutional layer is 1×1; a downsampling manner in each pooling layer is Max pooling, and the moving stride and a downsampling ratio are both $s_r=2$; all the convolutional layers use a ReLU activation function; and the full connected layer is obtained by a cross-layer splicing manner of the optimal scale features of all the convolutional layers, and contains the optimal scale features at various abstract levels.

4. The decision-making method according to claim 1, wherein the upper-layer dispatching indexes in the step 3 comprise feed quantity, total alkali liquor storage amount, a diaphragm pump, a roller mill, a ball mill, a leaf filter, a reclaimer, a vertical plate, an external discharge pump, an evaporator, roaster operation time, alkali liquor addition amount, whole-day ash discharge amount, total digestion feed quantity, ore breaking quantity and whole-day ore discharge quantity.

5. The decision-making method according to claim 1, wherein the comprehensive alumina production indexes in the step 4 comprise commercial alumina yield, actual alumina yield, aluminium hydroxide yield, alumina soda consumption, alumina energy consumption and alumina grade rate.

6. The decision-making method according to claim 5, wherein a specific method of the step 4.3 comprises the steps of:

performing correlation measurement on the comprehensive alumina production indexes at the past time, which are to be selected and related to the current working condition, through a Gaussian kernel function, as shown in the following formula:

$$K(d(\cdot)) = \frac{1}{\sqrt{2\pi}} e^{-\frac{1}{2}d(\cdot)^2},$$

wherein $K(d(\cdot))$ is a kernel function and $d(\cdot)$ represents Euclidean distance;

giving a working condition $X_d$ at a time d, firstly, calculating the probability that the working condition is distributed to the classification of various existing historical working conditions, and recording a result as $P=\{p_i(X_d|c_i)\}$, $i=1,2,\ldots,l_c$; then, in the classification of working conditions with a maximum probability, selecting first 4 working conditions under the classification of the working conditions through a k-nearest neighbor algorithm, which is denoted as:

$$\hat{X}_{center-nb}=\{X_{d_{center}}{}^{c_j},c_i\in C|i\neq j\},$$

wherein $c_j$ expresses the classification of the jth historical working condition, satisfying $p_j=\max(P)$;

recording a center point of the classification of the remaining working conditions as:

$$\hat{X}_{center-nb}=\{X_{d_{center}}{}^{c_j},c_i\in C|i\neq j\},$$

Using $\delta_d$ to express a vector consisting of a correlation between the working condition $X_d$ at the time d and the working conditions in relevant historical working conditions $\hat{X}_d=[\hat{X}_{top-nb}, \hat{X}_{center-nb}]$; combining the comprehensive alumina production index information $z_d$, $\delta_d$ corresponding to the historical working conditions $\hat{X}_d$ related to the working condition at the time d, and a classification probability $p_d$ corresponding to the historical working conditions together, and recording a combining result as:

$$Z_d=[z_d,\delta_d,p_d],$$

wherein $Z_d$ is used as an input of the full connected neural network prediction sub-model reflecting the influence of the comprehensive alumina production indexes at the past time on the current comprehensive alumina production indexes, and a size thereof is $(l_c+l_k-1)\times 3$; $Z_d$ not only contains the comprehensive alumina production indexes at the past time, but also the correlation information between the historical working condition and the current working condition of the comprehensive alumina production indexes.

7. The decision-making method according to claim 1, wherein, in a common training process of the multi-scale information neural network integrated model for the collaborative optimization of sub-model parameters, built in the step 5, an AdaGrad algorithm is selected for parameter updating of the multi-scale deep splicing convolutional neural network prediction sub-model, and a random gradient descent method is selected for parameter updating of other two single-layer full connected neural network sub-models.

* * * * *